(12) United States Patent
Tanamli et al.

(10) Patent No.: US 11,044,504 B2
(45) Date of Patent: Jun. 22, 2021

(54) INTELLECTUAL PROPERTY RIGHTS MANAGEMENT SOFTWARE SYSTEMS FOR VIDEO CONTENT AND METHODS OF THEIR MANUFACTURE AND USE

(71) Applicant: A&E Television Networks, New York, NY (US)

(72) Inventors: Susan Tanamli, New York, NY (US); Jeffrey McGrath, Chatham, NJ (US); Brian Doherty, Massapequa, NY (US); Neeraj Malik, Chatsworth, CA (US)

(73) Assignee: A&E Television Networks, New York, NY (US)

( * ) Notice: Subject to any disclaimer, the term of this patent is extended or adjusted under 35 U.S.C. 154(b) by 0 days.

(21) Appl. No.: 16/442,050

(22) Filed: Jun. 14, 2019

(65) Prior Publication Data
US 2020/0396494 A1 Dec. 17, 2020

(51) Int. Cl.
*H04N 21/254* (2011.01)
*G06F 21/10* (2013.01)
*H04N 21/4627* (2011.01)

(52) U.S. Cl.
CPC ......... *H04N 21/2541* (2013.01); *G06F 21/10* (2013.01); *H04N 21/4627* (2013.01)

(58) Field of Classification Search
CPC . H04N 21/2541; H04N 21/4627; G06F 21/10
See application file for complete search history.

(56) References Cited

U.S. PATENT DOCUMENTS

| | | | |
|---|---|---|---|
| 5,903,904 | A | 5/1999 | Peairs |
| 5,991,876 | A | 11/1999 | Johnson et al. |
| 7,171,619 | B1 | 1/2007 | Bianco |
| 7,386,460 | B1 | 6/2008 | Frank et al. |
| 8,868,463 | B2 | 10/2014 | Grannan |
| 2001/0044795 | A1 | 11/2001 | Cohen et al. |
| 2002/0099679 | A1 | 7/2002 | Usitalo et al. |
| 2003/0037034 | A1 | 2/2003 | Daniels et al. |
| 2004/0001106 | A1 | 1/2004 | Deutscher et al. |
| 2004/0079796 | A1 | 4/2004 | Hull et al. |
| 2004/0091234 | A1 | 5/2004 | Delorme et al. |
| 2005/0055357 | A1 | 3/2005 | Campbell |
| 2006/0047701 | A1 | 3/2006 | Maybury et al. |
| 2006/0156268 | A1 | 7/2006 | Wen et al. |
| 2006/0242261 | A1 | 10/2006 | Piot et al. |
| 2006/0271519 | A1 | 11/2006 | Blackwood et al. |
| 2006/0285772 | A1 | 12/2006 | Hull et al. |
| 2007/0050409 | A1 | 3/2007 | Bugir et al. |
| 2007/0300256 | A1 | 12/2007 | Coomer et al. |
| 2008/0040340 | A1 | 2/2008 | Varadarajan et al. |
| 2008/0046922 | A1* | 2/2008 | Jankins ............ H04N 21/25841 725/35 |

(Continued)

*Primary Examiner* — Sumaiya A Chowdhury
(74) *Attorney, Agent, or Firm* — Dentons US LLP

(57) ABSTRACT

This disclosure discloses various intellectual property rights management software systems for video content (e.g. episodes, series, seasons, movies, clips) that are able to predetermine intellectual property rights availabilities for the video content over many different combinations of factors (e.g. channels, territories, rights) such that these availabilities can be readily available (e.g. stored, cached) for a client (e.g. workstation, mobile device) to query against.

3 Claims, 3 Drawing Sheets

(56) References Cited

U.S. PATENT DOCUMENTS

| | | |
|---|---|---|
| 2008/0097919 A1* | 4/2008 | Szucs ................ H04N 21/2541 |
| | | 705/52 |
| 2008/0215474 A1 | 9/2008 | Graham |
| 2008/0301058 A1 | 12/2008 | Campbell et al. |
| 2008/0313226 A1 | 12/2008 | Bowden et al. |
| 2009/0183217 A1 | 7/2009 | Mukerji et al. |
| 2009/0199254 A1 | 8/2009 | White et al. |
| 2009/0271425 A1 | 10/2009 | Le Gall et al. |
| 2015/0161750 A1 | 6/2015 | Bugir et al. |
| 2016/0373794 A1* | 12/2016 | Heitlinger ........ H04N 21/25883 |

* cited by examiner

INTELLECTUAL PROPERTY RIGHTS MANAGEMENT SOFTWARE SYSTEMS FOR VIDEO CONTENT AND METHODS OF THEIR MANUFACTURE AND USE

TECHNICAL FIELD

This disclosure relates to intellectual property rights management software systems for video content.

BACKGROUND

An entity (e.g. television channel, video streaming service) may have various video content (e.g. episodes, series, seasons, movies, clips) assigned or licensed thereto. Consequently, the entity may need to effectively manage various intellectual property rights (e.g. cable rights, streaming rights, language rights, audio rights) for the video content in order to maximize its revenue. The intellectual property rights for the video content may differ temporally across various territorial jurisdictions.

Current intellectual property rights management software systems for the video content serve intellectual property rights information (e.g. words, numbers) to other downstream systems (e.g. servers, clients, applications) through various reports (e.g. files, prompts, spreadsheets, tables). To satisfy at least some needs of at least some business cases, multiple reports are typically generated at different schedules and these processes generally take many hours or days to run. When this data is ultimately available for the downstream systems, then this data is already stale (e.g. at least a few hours or days old) and with minimal or no options to accommodate additional intellectual property rights management scenarios, without further burdening (e.g. data bandwidth, network latency, computational cycles, memory space) other computing systems.

Another technical problem of the current intellectual property rights management software systems for the video content is that the reports contain static data. As such, drilling down or drilling through the static data is not effectively possible in order to find out what is causing an intellectual property right management collision (e.g. record conflict, content conflict, intellectual property right conflict). Therefore, in order to somewhat mitigate this technical problem, the current intellectual property rights management software systems enable ad hoc reports to be generated by some specially privileged users (e.g. attorneys, paralegals, directors, managers) and posted in a shared network drive for all other inquiries. However, not only is this practice computationally wasteful and inconvenient, but the ad hoc reports contain intellectual property rights information that is already out of date.

SUMMARY

In an embodiment, a method comprises: accessing, via a database server, a database storing a shows table, a contracts table, a rights table with a plurality of hierarchical rights identifiers, a territories table with a plurality of hierarchical territory identifiers, and a channels table with a plurality of hierarchical channel identifiers, wherein each of the rights table, the territories table, and the channels table is updated less frequently than each of the shows table and the contracts table, wherein the shows table contains a show record; creating, via the database server, a first record in the contracts table based on a first input from a client such that (1) the first record is related to the show record and (2) the first record contains a first hierarchical right identifier of the hierarchical rights identifiers populated from the rights table, a first hierarchical territory identifier of the hierarchical territory identifiers populated from the territories table, a first hierarchical channel identifier of the hierarchical channel identifiers populated from the channels table, and a first temporal range; creating, via the database server, a second record in the contracts table based on a second input from the client such that (1) the second record is related to the show record and (2) the second record contains a second hierarchical right identifier of the hierarchical rights identifiers populated from the rights table, a second hierarchical territory identifier of the territory identifiers populated from the territories table, a second hierarchical channel identifier of the channel identifiers populated from the channels table, and a second temporal range, wherein at least one of the second hierarchical right identifier, the second hierarchical territory identifier, the second hierarchical channel identifier, or the second temporal range is a respective subset of at least one of the first hierarchical right identifier, the first hierarchical territory identifier, the first hierarchical channel identifier, or the first temporal range; identifying, via the database server, a least restrictive difference between the at least one of the first hierarchical right identifier, the first hierarchical territory identifier, the first hierarchical channel identifier, or the first temporal range and the at least one of the second hierarchical right identifier, the second hierarchical territory identifier, the second hierarchical channel identifier, or the second temporal range; writing, via the database server, the least restrictive difference into a show profile stored in a data mart, wherein the show profile is related to the show record; enabling, via the database server, the data mart to generate a query response based on the show profile such that the query response includes an explanatory content relating to the least restrictive difference, wherein the query response is addressed to the client.

DETAILED DESCRIPTION

Figure 1:
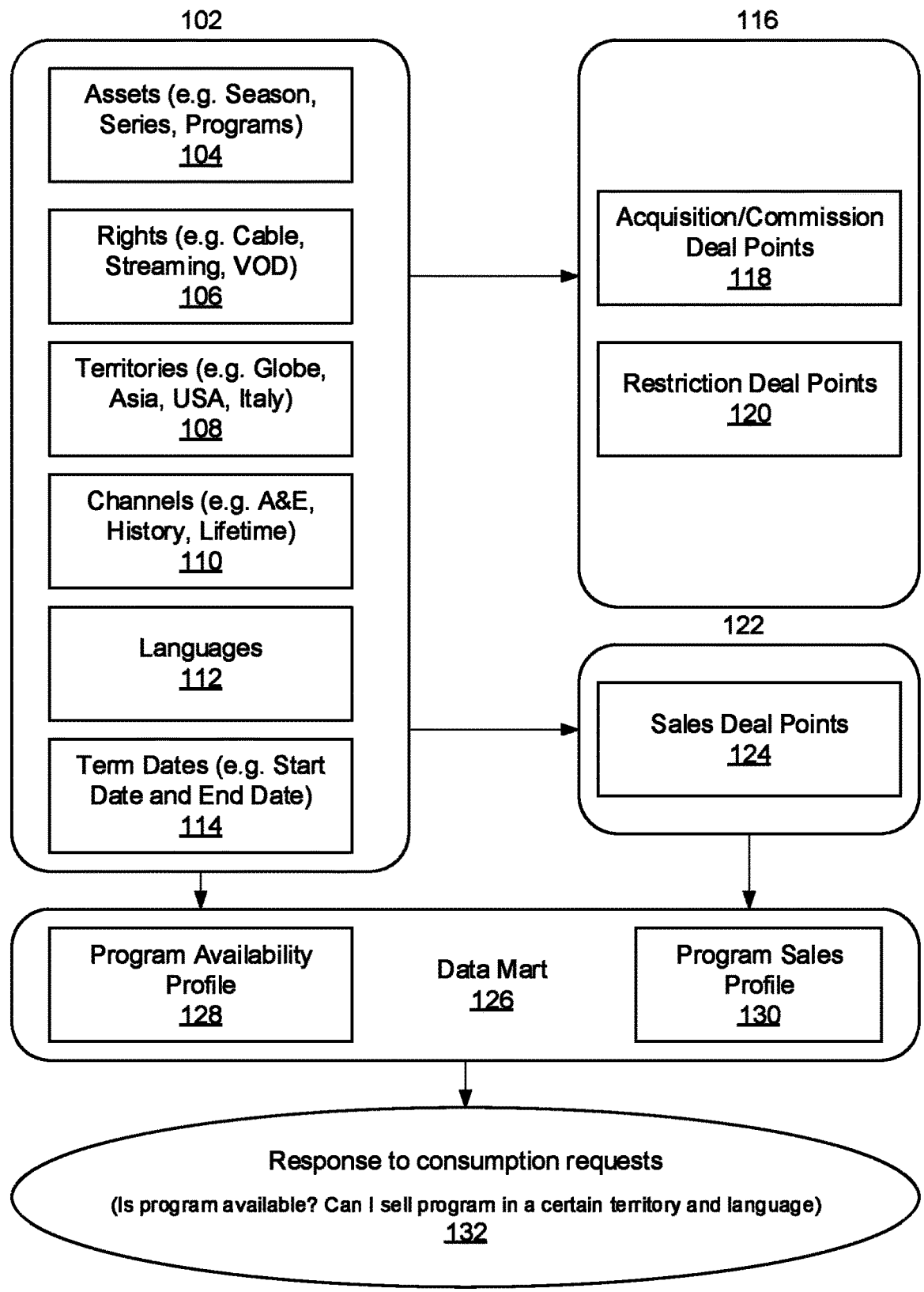
FIG. 1 shows a diagram of an embodiment of a logic flow in accordance with this disclosure.

Generally, this disclosure discloses various intellectual property rights management software systems for video content (e.g. episodes, series, seasons, movies, clips) that are able to pre-determine intellectual property rights availabilities for the video content over many different combinations of factors (e.g. channels, territories, rights) such that these availabilities can be readily available (e.g. stored, cached) for a client (e.g. workstation, mobile device) to query against. For example, these availabilities can be pre-determined for a lowest level of a hierarchy (e.g. channels, rights, territories, languages). In particular, these systems can quickly process, analyze, report, and publish intellectual property rights information for the video content, while being capable of integration with many preexisting rights management software systems (e.g. Jaguar). Further, these intellectual property rights management software systems for the video content include an executable logic (e.g.

functions, classes, queries) to determine intellectual property rights availability. This availability can be complex to determine because at least some intellectual property rights may be defined with multiple dimensional (e.g. two dimensions, three dimensions) vectors and hierarchies (e.g. territories, rights, channels), especially when this information is mandated to made immediately available and fed into various software systems (e.g. video content sales systems, video content broadcast scheduling systems). This determination involves at least some of these dimensional vectors and hierarchies to find a least restrictive combination of maximum amount of intellectual property rights that still remain available for a video content piece (e.g. episode, series, season, movie, clip). Therefore, the intellectual property rights management software systems for the video content can break down these hierarchies (e.g. territories, rights, channels) into a more or most granular level and then load this transformed data into a data mart that stores this data at such granular level and these hierarchies separately. Based on a request of a consuming application, a search can be done against this granular level data and then served up based on a level of the request from the consuming application in minutes (e.g. under 5 minutes). For example, a video content piece can contain an audio piece (e.g. song, tune). The video content piece can be recorded in a database as having all media rights, worldwide and in perpetuity in all languages. As recorded in the database, the audio piece cannot be streamed in Finland in 2019 (e.g. already licensed for that jurisdiction during that time period). These two database records are stored in the intellectual property rights management software system for the video content. Tis intellectual property rights information from these two database records can be sent to the data mart to build a rights profile for the video content piece. As such, if a client (e.g. consuming application) queries the intellectual property rights management software system for the video content whether the video content piece can be streamed in Europe during 2019, then the intellectual property rights management software system for the video content can generate a query response (e.g. words, numbers, graphics) that the video content piece can be streamed during 2019 in every country of Europe except for Finland. The query response can then be served to the client.

As explained herein, these intellectual property rights management software systems for the video content can take at least some component or building blocks of rights acquisition information and effectively store those for serving up an answer (e.g. text, numbers, graphics) to some, many, most, or all intellectual property rights question with an ability to show a detail of what makes up a clearance or a restriction. When the rights information is sent to other computing systems (e.g. video content sales systems, video content broadcasting scheduling systems), then the intellectual property rights information can be seamlessly embedded into a process or function and transformed into a local vernacular or use. Therefore, these intellectual property rights management software systems for the video content can output near real-time or real-time updates of many (e.g. over 200,000) contracts (e.g. database records, files) for many (e.g. over 80,000) video content pieces (e.g. database records, files) for downstream computing systems (e.g. programming and scheduling, international content sales systems).

Moreover, these intellectual property rights management software systems for the video content can be built using a service oriented architecture (SOA) federation of rights information to a set of consumer applications. The set of consumer applications can receive near real-time or real-time responses in order to support their processes (e.g. forms, reports) without having to rerun time consuming availability reports to analyze data that has not changed. As such, at least some data provided can give a full rights profile and not just answer rights information based on a specific question. For example, instead of just stating or prompting if a video content piece is available or not, the full rights profile can explain why the video content piece is not available, how long is the video content piece available or not, or when the video content piece would become available. For example, these intellectual property rights management software systems for the video content can answer some, many, most, or all intellectual property rights questions for a given rights/channel/territory/language/term request for general availability of the video content piece or availability plus sales collisions by questioning about one video content piece, a list of video content pieces or asking for a qualifying list of video content pieces based on component selections (e.g. can ask a question of whether there is an intellectual property rights availability for a video content piece based on a set of different criteria, and even if the video content piece is accordingly available, then has this video content piece already been sold in some territory, and if the video content piece has been sold, then what is an intellectual property rights availability to sell the video content piece relative as to what has not already been sold). For example, these intellectual property rights management software systems for the video content can provide an answer to a question informing which elements (e.g. channels, territories, languages) make a particular video segment piece not available and why. For example, if a question is asked about a particular video segment piece being available and an answer to the question is negative, then the answer can provide at least some explanatory insight as to why the particular video segment piece is not available and if there is a particular element (e.g. music, song) which is makes the particular video segment piece unavailable, then the answer can help a user to decide what action to take to make the particular video segment piece available. For example, these intellectual property rights management software systems for the video content can provide a set of video content intellectual property rights data in a form that matches appropriate verbiage per end consumer (e.g. ability able to map rights and channels from transactional asset/rights management system to a usage and language that the consuming system can understand).

Additionally, these intellectual property rights management software systems for the video content are desired for various reasons. For example, when an entity acquires the video content, at least some deal terms are complex. Therefore, there is a desire to know some, many, most, or all available uses of the video content in order to maximize use and revenue and to not incorrectly use which runs a risk of triggering licensing fees and lawsuits. For example, acquisition and sales are done with numerous deal terms. Deal terms can be multi-dimensional and can be hierarchical. The hierarchical terms can have inheritance of terms "up the tree." This hierarchical nature of deal terms is part of complexity and volume of records because, for example, USA level of information may assume North America, Western Hemisphere, and Worldwide. For example, a video content piece (e.g. an asset) can include what is being acquired or sold. Video content pieces can have many types (e.g. brand, series, season, program element.) This can include a first hierarchy. Some, many, most, or all intellectual property rights (e.g. database records) are paced at a program level and an element level. There are also versions of video content pieces because the intellectual property rights may be different depending on an intended use (e.g. international version has music replaced when original music can only be used in USA). This version can be treated as a separate program, but have a same hierarchy as its related program with an exception of elements that may be removed or added depending on how the video content piece is modified. For example, at least some intellectual property rights (e.g. database records) can relate to a media or intended use of the asset (e.g. cable, video-on-demand, streaming). This relationship can be manifested via a multi-level table (or another data structure) where the list includes a hierarchy. A parent right can assume all child rights unless specifically excluded. For example, a distribution channel (e.g. database records) can include a method by which a media item will be disseminated (e.g. A+E Networks, non-A+E Networks). This inclusion can be manifested via a hierarchical list (or another data structure) where inherited rights are assumed unless specifically excluded. For example, a territory (e.g. database records) can include names of jurisdictions where the video content can be exploited and can be manifested via a territory tree hierarchical list (or another data structure). For example, a term can include a period of time (e.g. date or time entered in predefined format) that video content piece can be used. Terms can be hard dates or triggered by events like individual show premiere date. For example, an exclusivity can include a flag (e.g. binary, Boolean, keyword) informative of an exclusive or non-exclusive use of a video content piece.

These intellectual property rights management software systems for the video content are sourced data in various ways. For example, at least some availability components in an intellectual property rights data warehouse originate from at least some acquisition contracts (e.g. database records) and sales contracts (e.g. database records). As such, with these intellectual property rights management software systems for the video content, various time-sensitive questions can be answered relatively easily. For example, some of these questions include when is a next sales window for a program, when is a next window available for a series, what is available (e.g. unutilized inventory), what programs are cleared for scheduling on linear (e.g. television) or multi-platform, or what programs are cleared to schedule (exclusively/non-exclusively). As such, the data for intellectual property rights of the video content (e.g. database records) can be fed to an internal program scheduling system (e.g. puts the video content on a schedule which results in a TV schedule that is available to general public and validates the video content against these intellectual property rights management software system to ensure allowance of airing the video on a specific network at a specific time) so availability and use can be determined when more video content are added to a scheduling grid of the internal program scheduling system. Note that non-linear rights (e.g. database records) for non-traditional or new media are also immediately available in a multi-platform scheduling module that enables users to schedule programs for non-traditional exploitation (e.g. cable on-demand, streaming video on-demand). Also, note that an international program sales computing system (e.g. ensures that only those programs which have the rights to be sold internationally are actually allowed to be sold internationally) can ingest intellectual property rights (e.g. database records) to be able to determine availability lists for sales people (e.g. to transform a set of rights and serve up an availability of a video content piece in a verbiage of a target system and in a language and business terms familiar to users of the target system). Moreover, these intellectual property rights management software systems for the video content can also serve as a network-based data source for business intelligence (BI) reporting dashboard (e.g. user interface). Also, note that when data is loaded into a data mart, multiple database jobs can be running in parallel to get various pieces of information into the data mart. Likewise, from a consumption perspective, when various downstream applications are querying the data mart, parallel processing is being used (e.g. multiple applications and multiple users are able to query the mart concurrently).

Figure 2:
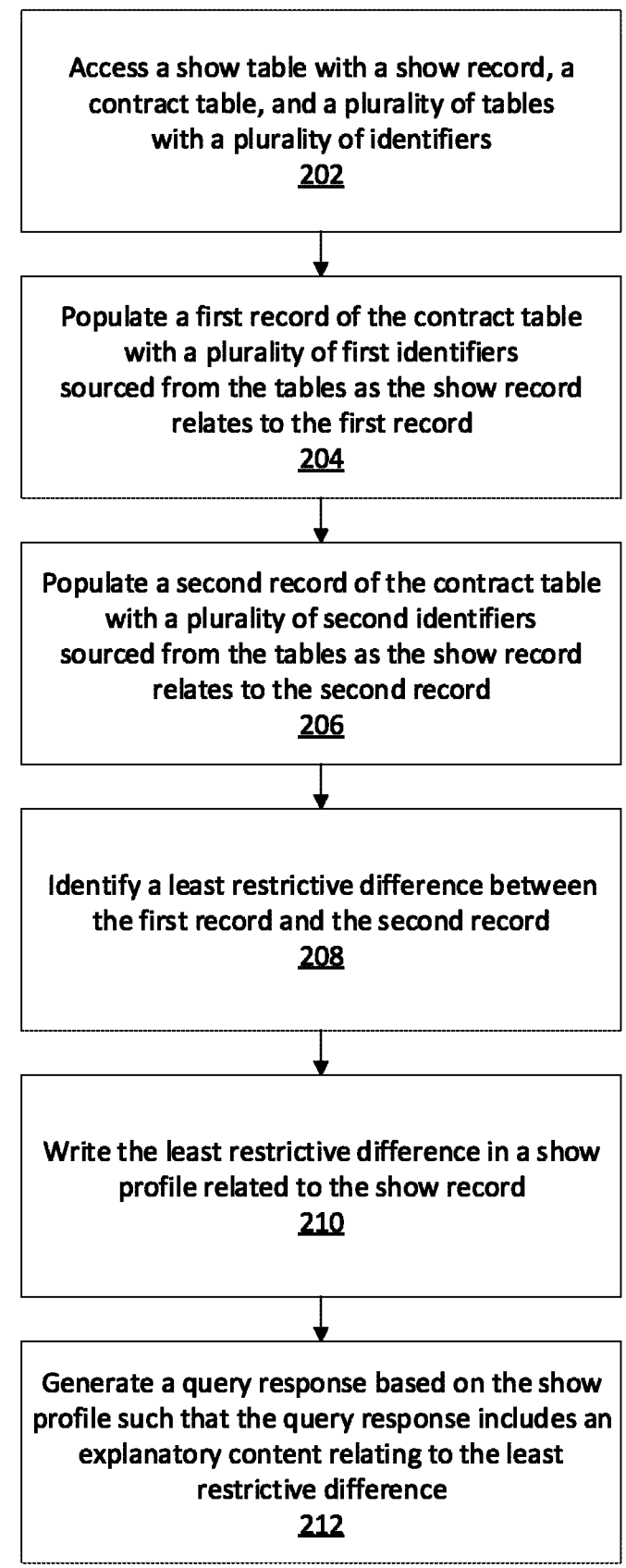
FIG. 2 shows a flowchart of an embodiment of a process for obtaining and using a least restrictive difference in accordance with this disclosure.
Figure 3:
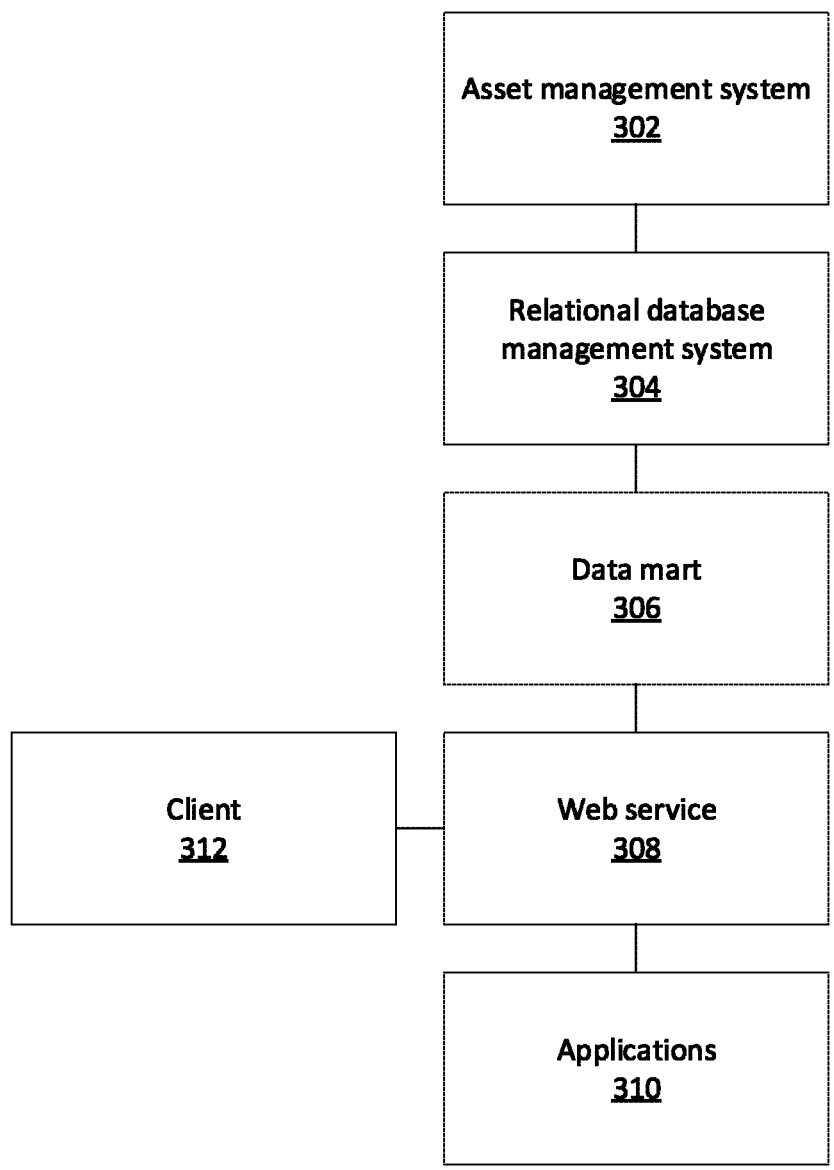
FIG. 3 shows a diagram of an embodiment of a system for obtaining and using a least restrictive difference in accordance with this disclosure.

This disclosure is now described more fully with reference to FIGS. 1-3, in which some example embodiments of this disclosure are shown. However, note that this disclosure may be embodied in many different forms and should not be construed as necessarily being limited to the example embodiments disclosed herein. Rather, these example embodiments are provided so that this disclosure is thorough and complete, and fully conveys all concepts of this disclosure to skilled artisans.

Features or functionality described with respect to certain example embodiments may be combined and sub-combined in or with various other example embodiments. Also, different aspects or elements of example embodiments, as disclosed herein, may be combined and sub-combined in a similar manner as well. Further, some example embodiments, whether individually or collectively, may be components of a larger system, wherein other procedures may take precedence over or otherwise modify their application. Additionally, a number of steps may be required before, after, or concurrently with example embodiments, as disclosed herein. Note that any or all methods or processes, at least as disclosed herein, can be at least partially performed via at least one entity or actor in any manner.

Terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Although terms first, second, etc. can be used herein to describe various elements, components, regions, layers or sections, these elements, components, regions, layers or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of this disclosure.

Terminology used herein is for describing particular example embodiments and is not intended to be necessarily limiting of this disclosure. As used herein, the singular forms "a," "an" and "the" are intended to include the plural forms as well, unless the context clearly indicates otherwise. Also, as used herein, the term "a" or "an" shall mean "one or more," even though the phrase "one or more" is also used herein. The terms "comprises," "includes," or "comprising," "including" when used in this specification, specify a presence of stated features, integers, steps, operations, elements, or components, but do not preclude a presence or addition of one or more other features, integers, steps, operations, elements, components, or groups thereof. Furthermore, when this disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized or overly formal sense unless expressly so defined herein.

FIG. 1 shows a diagram of an embodiment of a logic flow in accordance with this disclosure. In particular, a logic flow 100 includes a data source block 102, a deal block 116, a sales block 122, a profile block 126, and a response block 132. The data source block 102 includes an assets data structure 104 (e.g. database table, array), a rights data structure 106 (e.g. database table, array), a territories data structure 108 (e.g. database table, array), a channels data structure 110 (e.g. database table, array), a languages data structure 112 (e.g. database table, array), a term dates data structure 114 (e.g. database table, array). The deal block 116 includes an acquisition/commission deal points data structure (e.g. database table, array) and a restriction deal points data structure 120 (e.g. database table, array). The sales block 122 includes a sales deal points data structure 124 (e.g. database table, array). The profile block 126 includes a program availability profile 128 (e.g. database record, array) and a program sales profile 130 (e.g. database record, array). The response block 132 includes a logic (e.g. communication interface, messaging interface) for receiving a query from a client (e.g. workstation, application, mobile device, server) and sending a response for the query to the client.

The assets data structure 104 can be stored in a relational database (e.g. MS SQL server) or another data structure and can contain a plurality of entries, each having a plurality of fields. For example, each of the entries can include a field storing an identifier of a video content, a field storing a name of the video content, a field storing a duration of the video content, and other fields storing other hierarchical or non-hierarchical parameters related to the video content.

The rights data structure 106 can be can be stored in a relational database (e.g. MS SQL server) or another data structure and can contain a plurality of entries, each having a plurality of fields. For example, each of the entries can include a field storing an identifier of an intellectual property right, a field storing a name of the intellectual property right, and other fields storing other hierarchical and non-hierarchical parameters related to the intellectual property right. For example, some hierarchical parameters can include streaming rights and underneath the streaming rights can be mobile streaming rights and desktop streaming rights.

The territories data structure 108 can be can be stored in a relational database (e.g. MS SQL server) or another data structure and can contain a plurality of entries, each having a plurality of fields. For example, each of the entries can include a field storing an identifier of a territory, a field storing a name of the territory, and other fields storing other hierarchical or non-hierarchical parameters related to the territories. For example, some hierarchical parameters can include North America and underneath the North America can be USA, Canada, and Mexico.

The channels data structure 110 can be can be stored in a relational database (e.g. MS SQL server) or another data structure and can contain a plurality of entries, each having a plurality of fields. For example, each of the entries can include a field storing an identifier of a channel, a name of the channel, and other fields storing other hierarchical or non-hierarchical parameters related to the channels. For example, some hierarchical parameters can include A&E and underneath the A&E can be History and Lifetime.

The languages data structure 112 can be can be stored in a relational database (e.g. MS SQL server) or another data structure and can contain a plurality of entries, each having a plurality of fields. For example, each of the entries can include a field storing an identifier of a language and a name of the language and other fields storing other hierarchical or non-hierarchical parameters related to the channels. For example, the language can be English, Spanish, French, and others.

The term dates data structure 114 can be can be stored in a relational database (e.g. MS SQL server) or another data structure and can contain a plurality of entries, each having a plurality of fields. For example, each of the entries can include a field storing a start date and an end date.

As user guided, an intellectual property rights management software system for video content can group various entries of the assets data structure 104, the rights data structure 106, the territories data structure 108, the channels data structure 110, the languages data structure 112, and the term dates data structure 114 to create or populate the acquisition/commission deal points data structure 118 or the restriction deal points data structure 120. Note that each of the rights data structure 106, the territories data structure 108, the channels data structure 110, and the languages data structure 112 can be updated less frequently than each of the acquisition/commission deal points data structure 118 and the restriction deal points data structure 120. Further, note that when the acquisition/commission deal points data structure 118 and the restriction deal points data structure 120 is created or populated, then the acquisition/commission deal points data structure 118 or the restriction deal points data structure 120 can source (e.g. dropdown menu, autofill, drag-and-drop, matching) relevant data from the assets data structure 104, the rights data structure 106, the territories data structure 108, the channels data structure 110, the languages data structure 112, and the term dates data structure 114.

The intellectual property rights management software system for video content enables a user to create or populate the acquisition/commission deal points data structure 118 based on data sourced from the assets data structure 104, the rights data structure 106, the territories data structure 108, the channels data structure 110, the languages data structure 112, and the term dates data structure 114. For example, the acquisition/commission deal points data structure 118 can be created or populated to inform that Show A from 2000 to 2020 has all media intellectual property rights (e.g. free cable, streaming) in USA in English language. Then, the intellectual property rights management software system for video content enables the user to create or populate the restriction deal points data structure 120 by an input of exclusionary or restriction information relative to at least some data already stored the acquisition/commission deal points data structure 118. For example, the input of exclusionary or restriction information relative to at least some data already stored the acquisition/commission deal points data structure 118 can include that the Show A does not have streaming intellectual property rights in USA in English Language from 2011 to 2013. Then, the intellectual property rights management software system for video content enables the user to create or populate the sales deal points data structure 124 by an input of already sold data relative to at least some data already stored the acquisition/commission deal points data structure 118. For example, the input of already sold data relative to at least some data already stored the acquisition/commission deal points data structure 118 can include that intellectual property rights for Show A were sold to Fox Television for year 2017 to 2018 in USA in English language. As such, holistically speaking, relative to intellectual property rights information, although Show A was available for 20 years in USA in English language, there is a 2 year period where Show A is restricted from being streamed in USA in English language and there 1 a year period where Show A is sold. Consequently, if the user is looking for a net intellectual property rights availability of Show A, then the intellectual property rights management software system for video content outputs that Show A has the net intellectual property rights availability for a 17 year period in USA in English language.

This information is input (e.g. written) into the profile block 126, which can be manifested via a data mart storing the program availability profile 128 and the program sales profile 130 as distinct profiles (e.g. distinct database records, distinct arrays, distinct tables). The program availability profile 128 is created or populated based on a hierarchical and non-hierarchical difference between the acquisition/commission deal points data structure 118 (what intellectual property rights were maximally available for a specific piece of a video content) and the restriction deal points data structure 120 (what intellectual property rights are currently excluded or restricted for a specific piece of a video content). For example, since (1) the acquisition/commission deal points data structure 118 informs that Show A from 2000 to 2020 has all media intellectual property rights (e.g. free cable, streaming) in USA in English language and (2) the restriction deal points data structure 120 informs that the Show A does not have streaming intellectual property rights in USA in English language from 2011 to 2013, then, responsive to receiving a query from the response block 132, as generated via a client, inquiring about intellectual property rights availability of Show A in USA in English language, then the profile block 126 (e.g. data mart) outputs that Show A has an intellectual property rights availability for a 18 year period in USA in English language other than from 2011 to 2013. Resultantly, the profile block 126 (e.g. data mart) can generate (e.g. copy, retrieve, create) a response for the query and the send the response to the response block 132 for forwarding to the client. Note that the query can inquire about what intellectual property rights were maximally available or what intellectual property rights are remaining. Likewise, the program sales profile 130 is created or populated based on a hierarchical and non-hierarchical information sourced from the sales deal points data structure 124. As such, responsive to receiving a query from the response block 132, as generated via a client, the profile block 126 can determine a net availability for Show A based on a hierarchical and non-hierarchical difference between the program availability profile 128 (what intellectual property rights are currently maximally available for a specific piece of a video content) and the program sale profile 130 (what intellectual property rights are currently sold for a specific piece of a video content). Resultantly, using the example from above, if the program sale profile 130 informs that intellectual property rights for Show A were sold to Fox Television for year 2017 to 2018 in USA in English language, then, responsive to receiving a query from the response block 132, as generated via a client, inquiring about intellectual property rights net availability of Show A in USA in English language, then the profile block 126 (e.g. data mart) outputs that Show A has an intellectual property rights availability for a 17 year period in USA in English language other than from 2011 to 2013 and 2017 and 2018. Note that the program availability profile 128 and the program sale profile 130 are distinct or independent and thereby technically beneficial because such data organization within the profile block 126 (e.g. data mart) enables query response depending on what query is input (e.g. query for net availability may be different from net sales availability or query for sales information may not involve net availability).

When the data source block 102 (inclusive of any components thereof) or the deal block 116 (inclusive of any components thereof) are modified (e.g. updated), then the profile block 126 does not modify (e.g. update) the program availability profile 128 or the program sales profile 130 for all of profiles for pieces of video content identified therein. Rather, the profile block 126 only updates the program availability profile 128 or the program sales profile 130 for a specific piece of video content that relates to what has been modified.

FIG. 2 shows a flowchart of an embodiment of a process for obtaining and using a least restrictive difference in accordance with this disclosure. In particular, a process 200 includes blocks 202-212, which are performed using the logic flow 100, as explained above.

In block 202, as explained above, a processor (e.g. multicore server parallel processor) accesses a show table, a contract table, and a plurality of tables with a plurality of identifiers. The show table includes with a show record. The show table corresponds to the assets data structure 104. The contract table corresponds to the deal block 116. The tables with the identifiers can be hierarchical or non-hierarchical and correspond to the rights data structure 106, the territories data structure 108, the channels data structure 110, the languages data structure 112, and the term dates data structure 114.

In block 204, as explained above, the processor populates a first record of the contract table with a plurality of first identifiers sources from the tables as the show record relates to the first record. The first record corresponds to the acquisition/commission deal points data structure 118. The first identifiers from the tables correspond to hierarchical and non-hierarchical data (e.g. text, numbers) sourced from the rights data structure 106, the territories data structure 108, the channels data structure 110, the languages data structure 112, and the term dates data structure 114. This enables the acquisition/commission deal points data structure 118 to be created or populated.

In block 206, as explained above, the processor populates as explained above, the processor populates a second record of the contract table with a plurality of second identifiers sources from the tables as the show record relates to the second record. The second record corresponds to the restriction deal points data structure 120. The second identifiers from the tables correspond to hierarchical and non-hierarchical data (e.g. text, numbers) sourced from the rights data structure 106, the territories data structure 108, the channels data structure 110, the languages data structure 112, and the term dates data structure 114. This enables the restriction deal points data structure 120 to be created or populated.

In block 208, as explained above, the processor identifies a least restrictive difference between the first record and the second record. The least restrictive difference can be identified based on a hierarchical and non-hierarchical difference between the first record (the acquisition/commission deal points data structure 118—what intellectual property rights were maximally available for a specific piece of a video content) and the second record (the restriction deal points data structure 120—what intellectual property rights are currently excluded or restricted for a specific piece of a video content).

In block 210, as explained above, the processor writes the least restrictive difference into a show availability profile that is related to show record. The show availability profile corresponds to the program availability profile 128.

In block 212, as explained above, the processor generates a query response based on the show profile such that the query response includes an explanatory content relating to the least restrictive difference. For example, using some examples described above, since (1) the first record (the acquisition/commission deal points data structure 118) informs that Show A from 2000 to 2020 has all media intellectual property rights (e.g. free cable, streaming) in USA in English language and (2) the second record (the restriction deal points data structure 120) informs that the Show A does not have streaming intellectual property rights in USA in English language from 2011 to 2013, then, responsive to receiving a query, as generated via a client, inquiring about intellectual property rights availability of Show A in USA in English language, then the processor (e.g. data mart machine) outputs that Show A has an intellectual property rights availability for a 18 year period in USA in English language other than from 2011 to 2013. Resultantly, the processor can generate (e.g. copy, retrieve, create) a response for the query and the send the response to the to the client.

FIG. 3 shows a diagram of an embodiment of a system for obtaining and using a least restrictive difference in accordance with this disclosure. In particular, a system 300 uses the logic flow 100 to implement the process 200. The system 300 includes an asset management system 302, a relational database management system (RDBMS) 304, a data mart 306, a web service 308, a set of applications 310, and a client 312, which can be distributed among a plurality of data centers or co-hosted in a single data center. The RDBMS is communicatively positioned between the asset management system 302 and the data mart 306. The data mart 30 is communicatively positioned between the RDBMS 304 and the web service 308. The web service 308 is communicatively positioned between the data mart 306 and at least one of the client 312 or the set of applications 310.

As explained above, the asset management system 302 can includes an enterprise-wide application geared towards intellectual property rights management of video content. For example, the asset manage system 302 can include Jaguar System 7 software application. The RDBMS 304 can include Oracle, MySQL, or MS SQL Server. The data mart 306 can be a subset of a data warehouse, can be read-only, can employ a schema (e.g. star, snowflake), or can be a logical subset of a larger data warehouse. The web service 308 can include a software system designed to support interoperable machine-to-machine interaction over a network. The web service 308 can include an interface described in a machine-readable format (e.g. Web Services Description Language). The set of applications 310 can include various enterprise applications (e.g. video content sales systems, video content broadcast scheduling systems). The client 312 can include a physical device (e.g. workstation, mobile device) or virtual entity (e.g. virtual server, application, daemon).

Various embodiments of this disclosure may be implemented in a data processing system suitable for storing or executing program code that includes at least one processor coupled directly or indirectly to memory elements through a system bus. The memory elements can include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

This disclosure may be embodied in a system, a method, or a computer program product. The computer program product may include a computer readable storage medium (or media) having computer readable program instructions thereon for causing a processor to carry out aspects of this disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network or a wireless network. The network may comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of this disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of this disclosure.

Aspects of this disclosure are described herein with reference to flowchart illustrations, or block diagrams of methods, apparatus (systems), and computer program products according to embodiments of the disclosure. It will be understood that each block of the flowchart illustrations or block diagrams, and combinations of blocks in the flowchart illustrations, or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The flowchart and block diagrams in enclosed figures illustrate the architecture, functionality, and operation of possible implementations of systems, methods, and computer program products according to various embodiments of this disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Although preferred embodiments have been depicted and described in detail herein, skilled artisans will recognize that various modifications, additions, substitutions and the like can be made without departing from spirit of this disclosure, and these are, therefore, considered to be within this disclosure, as defined in claims that follow.

The invention claimed is:

1. A method comprising:
accessing, via a database server, a database storing a shows table, a contracts table, a rights table with a plurality of hierarchical rights identifiers, a territories table with a plurality of hierarchical territory identifiers, and a channels table with a plurality of hierarchical channel identifiers, wherein each of the rights table, the territories table, and the channels table is updated less frequently than each of the shows table and the contracts table, wherein the shows table contains a show record;

creating, via the database server, a first record in the contracts table based on a first input from a client such that (1) the first record is related to the show record and (2) the first record contains a first hierarchical right identifier of the hierarchical rights identifiers populated from the rights table, a first hierarchical territory identifier of the hierarchical territory identifiers populated from the territories table, a first hierarchical channel identifier of the hierarchical channel identifiers populated from the channels table, and a first temporal range;

creating, via the database server, a second record in the contracts table based on a second input from the client such that (1) the second record is related to the show record and (2) the second record contains a second hierarchical right identifier of the hierarchical rights identifiers populated from the rights table, a second hierarchical territory identifier of the territory identifiers populated from the territories table, a second hierarchical channel identifier of the channel identifiers populated from the channels table, and a second temporal range, wherein at least one of the second hierarchical right identifier, the second hierarchical territory identifier, the second hierarchical channel identifier, or the second temporal range is a respective subset of at least one of the first hierarchical right identifier, the first hierarchical territory identifier, the first hierarchical channel identifier, or the first temporal range;

identifying, via the database server, a least restrictive difference between the at least one of the first hierarchical right identifier, the first hierarchical territory identifier, the first hierarchical channel identifier, or the first temporal range and the at least one of the second hierarchical right identifier, the second hierarchical territory identifier, the second hierarchical channel identifier, or the second temporal range;

writing, via the database server, the least restrictive difference into a show profile stored in a data mart, wherein the show profile is related to the show record;

enabling, via the database server, the data mart to generate a query response based on the show profile such that the query response includes an explanatory content relating to the least restrictive difference, wherein the query response is addressed to the client.

2. The method of claim 1, wherein the query response is generated using a parallel processing technique.

3. The method of claim 1, wherein at least one of the first hierarchical right identifier, the first hierarchical territory identifier, the first hierarchical channel identifier, or the first temporal range includes a plurality of sub-hierarchical identifiers.

* * * * *